United States Patent [19]

Hunschede et al.

[11] 4,321,941
[45] Mar. 30, 1982

[54] PILOT OPERATED PRESSURE RELIEF VALVE

[75] Inventors: Karlheinz Hunschede, Marktheidenfeld; Helmut Krebs, Gemünden, both of Fed. Rep. of Germany

[73] Assignee: Mannesmann Rexroth GmbH, Lohr, Del.X

[21] Appl. No.: 212,673

[22] Filed: Dec. 3, 1980

[30] Foreign Application Priority Data

Dec. 12, 1979 [DE] Fed. Rep. of Germany ....... 2949922

[51] Int. Cl.$^3$ ............................................. G05D 11/00
[52] U.S. Cl. .................................................. 137/116.3
[58] Field of Search ............ 137/116.3, 116.5, 505.12, 137/85, 86, 102, 489.5

[56] References Cited

U.S. PATENT DOCUMENTS

| 2,225,916 | 12/1940 | Maglott | 137/489.5 |
| 3,115,147 | 12/1963 | Mueller | 137/85 |
| 3,326,228 | 6/1967 | Phillips | 137/86 |
| 3,489,163 | 1/1970 | Breitsprecher et al. | 137/116.3 |
| 3,583,422 | 6/1971 | Dach et al. | 137/116.3 |

Primary Examiner—H. Jay Spiegel
Attorney, Agent, or Firm—Michael J. Striker

[57] ABSTRACT

A pilot operated pressure relief valve unit has a main valve having a main piston movable between two control spaces interconnected by a passage provided with a nozzle; one of the control spaces is constituted by two separate control chambers delimited by corresponding areas of the main piston whereby one of the chambers is directly connected to the pilot valve and the other control chamber is connected to the pilot valve via a nozzle.

4 Claims, 1 Drawing Figure

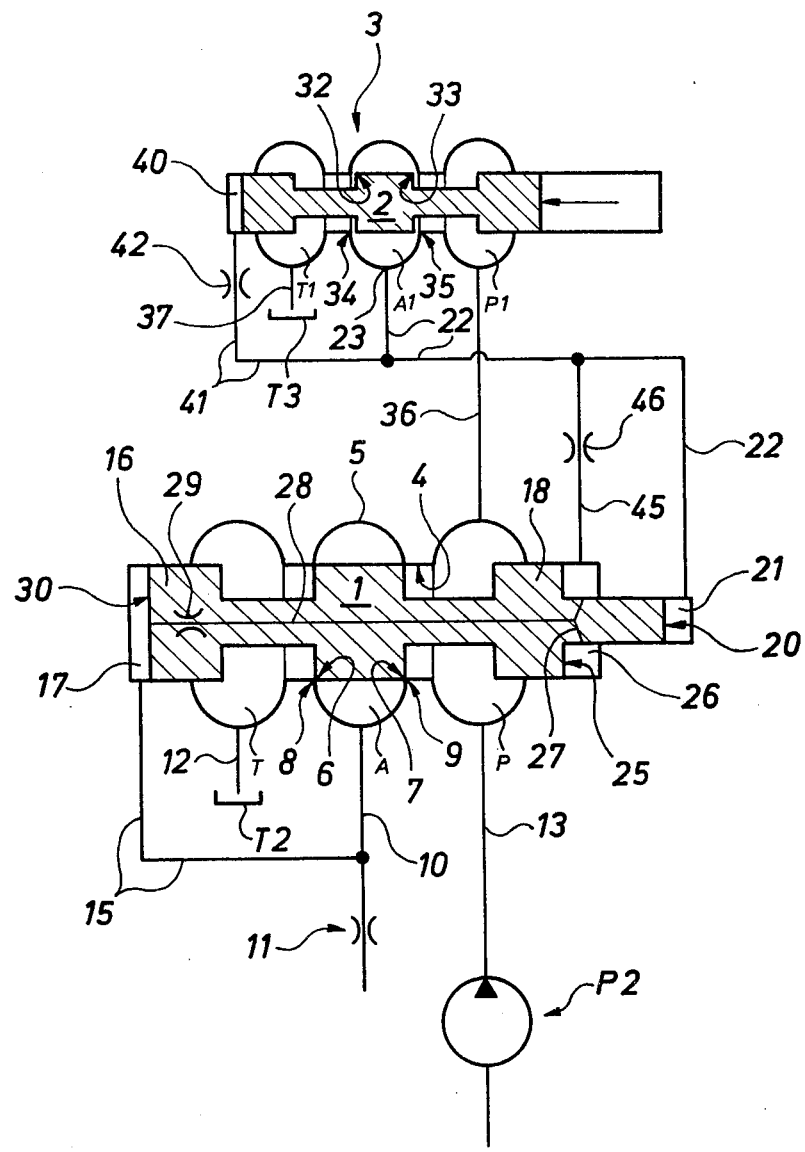

PILOT OPERATED PRESSURE RELIEF VALVE

BACKGROUND OF THE INVENTION

The present invention relates in general to compound relief valves and in particular to a pilot operated relief valve of the type which has a main valve including two control spaces, a main pressure port, a consumer port, and a main piston defining two end faces adjoining respectively the control spaces; one control space is connected to the consumer port and a pilot valve is connected between a source of control pressure and the other control space to move the main piston in one direction in which a communication between the main pressure port and the consumer port is established while pressure in the consumer port acts in counter direction.

In a known pressure relief valve of the abovedescribed type, a throttling point is established in the connection between the consumer and a control space of the main valve. Another throttling point takes place also in the connection between the other control space and the pilot valve. An immediate connection is provided between the main pressure reducing valve and its pilot valve and communicates with a source of pressure fluid medium. Nonetheless, there is no immediate connection between the consumer and the pilot valve. The disadvantage of such prior-art designs is in the fact that the response of the valve is unsatisfactory and depends excessively on the amount of pressure and rate of flow of the pressure medium.

SUMMARY OF THE INVENTION

It is therefore a general object of the present invention to overcome the aforementioned disadvantages.

More particularly, it is an object of the invention to provide an improved pilot operated pressure relief valve which, by establishing a connection between the consumer and the pilot valve, improves the overall response of the pressure relieving valve.

Another object of the invention is to provide such an improved pressure relief valve in which the interdependency between the pressure and the rate of the pressure medium flow is reduced.

In keeping with these objects, and others which will become apparent hereafter, one feature of the invention resides, in a pilot operated pressure relief valve of the aforedescribed type, in the provision of a passage in the main piston to interconnect end faces of the latter and thus the two control spaces and a nozzle formed in the passage.

Tests performed with one embodiment of the valve according to this invention have shown that the dependence of the pressure of the working medium flowing through the pressure relief valve on the rate of flow is substantially reduced, such as for example by about one half in comparison to prior-art valves. Also pressure peaks occurring during the operation of the valve are reduced about one half when the measures according to this invention are employed. Due to the pressure gradient between the two control spaces of the pressure relieving valve, the response of the main regulating piston with respect to the pressure variations is also considerably improved. By virtue of the intermediate connection between the consumer and the pilot valve, the latter responds immediately to pressure variations at the consumer port of the main pressure reducing valve. This intermediate connection can be established either in the main valve body outside the main valve piston or in a more preferred variation within the main piston to extend along its center axis.

In another preferred embodiment, the other control space communicating via the pilot valve the source of control pressure, is divided into two separate control chambers of which one is directly connected via the pilot valve to the source of control pressure and the other chamber is connected to the source of control pressure by a throttle and only this other control chamber communicates via the passage and the nozzle with the first control space. In this manner, the main piston of the pressure relieving valve becomes more responsive and simultaneously its damping is improved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a schematic sectional side view of a compound pressure relief valve of this invention.

DESCRIPTION OF THE PREFERRED EMBODIMENT

The compound pressure relief valve of this invention is assembled of a three-way pressure relief valve having a housing 5 provided with a longitudinal bore 4 in which a main piston 1 is movable in two opposite directions. A pilot valve 3 has a pilot piston 2. For the sake of clarity, both the pilot piston 2 and the main piston 1 are shown in cross-section and designated by hatched lines. The main valve 5 defines an annular pressure inlet space B, and consecutively arranged, a consumer space A and an outlet space P. Control edges 6 and 7 on the piston 1 cooperate with control edges 8 and 9 at the consumer annular space A in the main valve housing 5 so that, according to the axial position of the main valve 1, the consumer space A communicates either with the pressure outlet space T or with the pressure inlet space P or, in the illustrated central position of the main piston, the consumer space A is closed and separated from either of the annular spaces T and P.

The annular consumer space A is connected via a conduit 10 to a consumer 11 illustrated in the drawing as a throttle. The outlet space T is connected via a return conduit 12 to a tank T2, and the inlet annular space P is connected via a pressure conduit 13 to a pump P2. A branch conduit 15 connects a control space 17 adjoining end face 30 of the left end piston area 16, to the working conduit 10 and thus to the consumer space A. The piston area 18 at the other end of the piston 1 has a step-like configuration whereby the end face 20 of reduced diameter adjoins a control chamber 21 which is connected through a control conduit 22 to a control port 23 of the pilot valve 3. The step-like surface 25 of the piston area 18 adjoins a second control chamber 26 which communicates according to one feature of this invention by means of radial passages 27, a blind bore 28 and a feedback nozzle 29 with the control space 17 which, as mentioned before, is connected by the conduit 15 to the consumer 11. In this example, the bores 27, 28 and the nozzle 29 are formed in the main piston 1.

The pilot piston 2 of the pilot valve 3 is also formed with two control edges 32 and 33 cooperating with corresponding control edges 34 and 35 of an annular control space A1 in the pilot valve housing. As depicted in the drawings, the control edges 32 and 33 on the pilot piston 2 are spaced apart from one another by a smaller distance than is the clearance between the control edges 34 and 35 of the space A1; that is, a certain gap is always left between the control space A1 and the central bore in the pilot valve 3. The pilot valve further includes a pressure inlet space P1 which is connected via a conduit 36 to the pressure inlet space P of the main relief valve and thus to the conduit 13 leading to the pump P2. Due to the clearance between the edges 32 and 34 and 33 and 35 in the central position of the pilot piston 2, the control space A1 is connected both with the pressure inlet space P1 and the pressure outlet space T1, the latter being connected through conduit 37 to a tank T3. The illustrated central position of the pilot piston 2 corresponds to the starting position of the whole relief valve. Due to the permanent gap between the control edges 32–35, a continuous small leakage of control pressure oil takes place. This leakage, however, is acceptable inasmuch as it eliminates inactive times during the regulating action so that the main pressure relieving piston responds promptly and the control pressure from the pilot valve is quickly readjusted.

The control pressure in pilot valve 3 is adjusted by means of a spring force which acts on the pilot piston 2 in the direction toward the control space 40. The latter space 40 is connected through a coupling nozzle 42 to the control conduit 22 and thus to the control port A1.

The control space 26 in the main valve is connected to the control conduit 22 via a conduit 45 and a throttle or restrictor 46.

The consumer 11 is connected to the control space of the pilot valve 3 via the conduit 15, the control space 17, the feedback nozzle 29 and the central bore 28, the radial bores 27, the control chamber 26, the conduit 45 and the nozzle 46, the control conduits 22 and 41, and the nozzle 42. If the control pressure in the control conduit 22 and thus in the control space 40 deviates from the pressure that is determined by the force of spring or solenoid acting on the pilot piston 2 in the direction towards the control space 40, the pilot piston 2 starts performing its regulating function and moves in a direction in which the control pressure is balanced. For example, if the control pressure is smaller than the force of the biasing spring, the pilot piston 2 moves due to the resulting force difference in the direction of the control space 40. As a consequence, the clearance between the control edges 32 of the pilot piston 2 and the edges 34 of the space A1 is reduced whereas the clearance between the control edges 33 of the piston 2 and the control edges 35 of the space A1 is increased. Due to the resulting larger throttling effect between the cooperating control edges 32 and 34, pressure in the control space A1 is increased and so is the pressure in control space 40 which is connected with the space A1 via the conduit 41 and the throttle 42. As soon as the pressure in the space 40 has attained a value corresponding to the force of biasing spring or solenoid, the pilot piston 2 starts moving again into its starting position. The regulating movement of the pilot piston 2 is damped by the coupling throttle 42.

At the same time, the increased pressure in the control space A1 is transmitted via the control conduit 22 in the control chamber 21, and via the throttle 46 and conduit 45 into the control chamber 26 of the main valve. The pressure build-up in control chambers 26 and 21 counteracts the pressure existing in the opposite control space 17 and consequently the main piston 1 is moved so long until the opposing forces are balanced. For example, if pressure in the control chamber 26 exceeds that in the control space 17, pressure oil starts flowing through radial bores 27, the central bore 28 and the feedback nozzle 29 into the control space 17. Pressure in the space 17 equals that of the consumer 11.

By virtue of the connection of the consumer 11 with the control space 40 in the pilot valve 3, the latter is immediately influenced by pressure on the consumer and consequently a corresponding influence is exerted on the control pressure that is adjusted to a desired value and applied via conduit 22 to the control chamber 21 and the main piston 1.

Due to the connection between the control space 17 and the control chamber 26, a pressure equalization process takes place therebetween. According to this pressure equalization, the effective pressure surface of the end face 30 of the main piston corresponds to the effective flange surface 20 at the opposite end of the main piston 1. To induce a regulating movement of the main piston 1, a smaller amount of controlling pressure fluid is therefore needed for changing the volume of the control chamber 21. As a consequence, the sensitivity of response of the main piston 1 is greatly enhanced.

Upon the deflection of the main piston 1 from its central position, control oil flows though the feedback nozzle 29 so that the latter produces a well-defined damping effect on the piston. Closing forces acting on the main piston 1 are fully or partially compensated by the pressure gradient on the feedback nozzle 29 that continuously acts in the opening direction of the pressure relief valve.

In another non-illustrated embodiment, the steplike surfaces 20 and 25 are arranged in one plane so that instead of two control chambers 21 and 26 only a single control space, communicating with the central bore 28 in the main piston 1, will result. In this case, the section of the control conduit 22 between the control chamber 21 and the conduit 45, is dispensed with. In another modification, a throttle can be included in the conduit 15. In the latter embodiment, the advantage of two separate control chambers 21 and 26, namely that the control chamber 26 is connected to the control space A1 of the pilot valve 3 via a throttle 46 whereas the other control chamber 21 is directly connected with the control space A1, is now eliminated.

As a pilot valve, there can also be employed a flow control valve in combination with a spring or solenoid-operated smaller pressure limiting valve. This pressure limiting valve has its outlet port connected to the tank whereas its inlet port is connected to the control chambers 21 and 26 and to the outlet of the flow control valve. The throttle 46 is connected to the conduit leading to the control chamber 26. The flow control valve has its inlet port connected to a control space P and operates with a smaller flow of pressure fluid and the desired control pressure is adjusted on the pressure limiting valve. Due to the small size of the pressure limiting valve, the latter requires only a relatively small force of biasing spring or solenoid.

The main valve can be also constructed as a two-way pressure relief valve.

It will be understood that each of the elements described above, or two or more together, may also find a useful application in other types of constructions differing from the types described above.

While the invention has been illustrated and described as embodied in a pilot operated pressure relief valve unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pilot operated pressure relief valve unit comprising a main valve including a hollow body; a main piston arranged for reciprocating movement in the body and having two opposite end faces each bounding with said body a control space; a main pressure channel, a consumer channel and a return channel opening, respectively, into the hollow body between said control spaces; said main piston controlling communication between said channels; one of the control spaces being connected to the consumer channel; a passage formed with a nozzle interconnecting said control spaces; a pilot valve including a second hollow body, a pilot piston arranged for reciprocating movement in the second body and having a first end face bounding with the second body a pilot control space and a second end face bounding with the second body a chamber including means biasing the pilot piston in opposition to pressure in said pilot control space; a pilot pressure channel, a pilot control channel and a pressure outlet channel, said pilot control channel communicating with the pilot control space; said pilot piston controlling communication between said channels; and a control conduit connecting said pilot control space to the other control space of the main valve for admitting a control pressure to the other control space in order to move said main piston in a direction in which communication is established between said main pressure channel and said consumer channel while pressure in said consumer channel acts in opposite direction on the main piston and, through the interconnecting passage and nozzle, on the pilot piston.

2. A pilot operated pressure relief valve unit as defined in claim 1, wherein said passage and said nozzle are formed in said main piston and extend in the longitudinal direction of the latter.

3. A pilot operated pressure relief valve unit as defined in claim 1, wherein said other control space in said main valve unit is formed of two separate pressure control chambers adjoining respectively two separate surface portions of the adjoining end face of said main piston, one of said control chambers being directly connected to said pilot valve and the other control chamber being connected to said pilot valve via a throttle, said other control chamber being connected to said passage communicating via said nozzle with said one control space.

4. A pilot operated pressure relief valve unit as defined in claim 1, wherein said pilot control channel communicates with the pilot control space through a throttle.

* * * * *